Nov. 28, 1950 — A. ORSCHELN — 2,531,740
BRAKE OPERATING OR SIMILAR MECHANISM
Filed Dec. 27, 1948 — 2 Sheets-Sheet 1
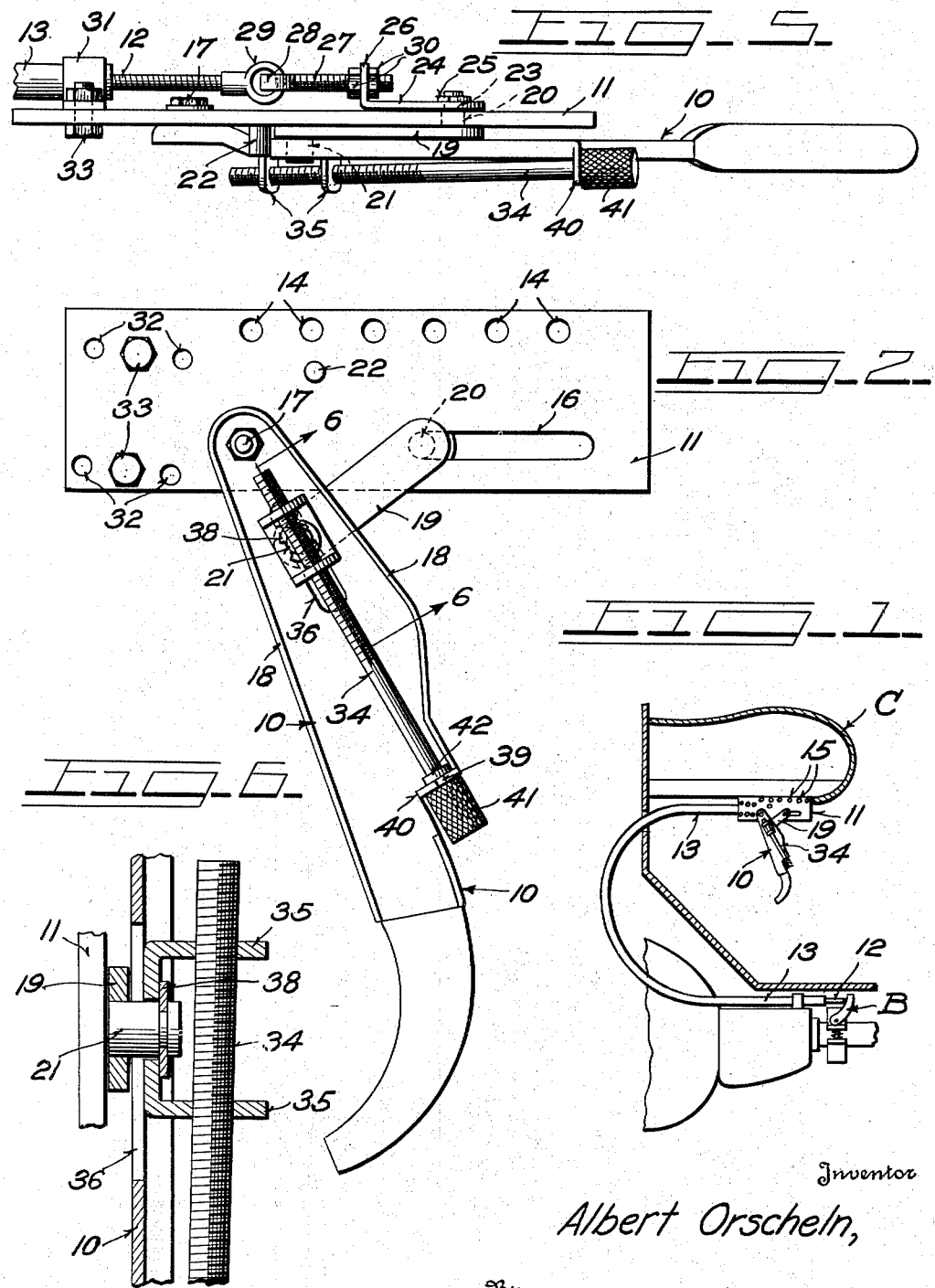
Inventor
Albert Orscheln,
By H. B. Willson & Co.
ATTORNEYS

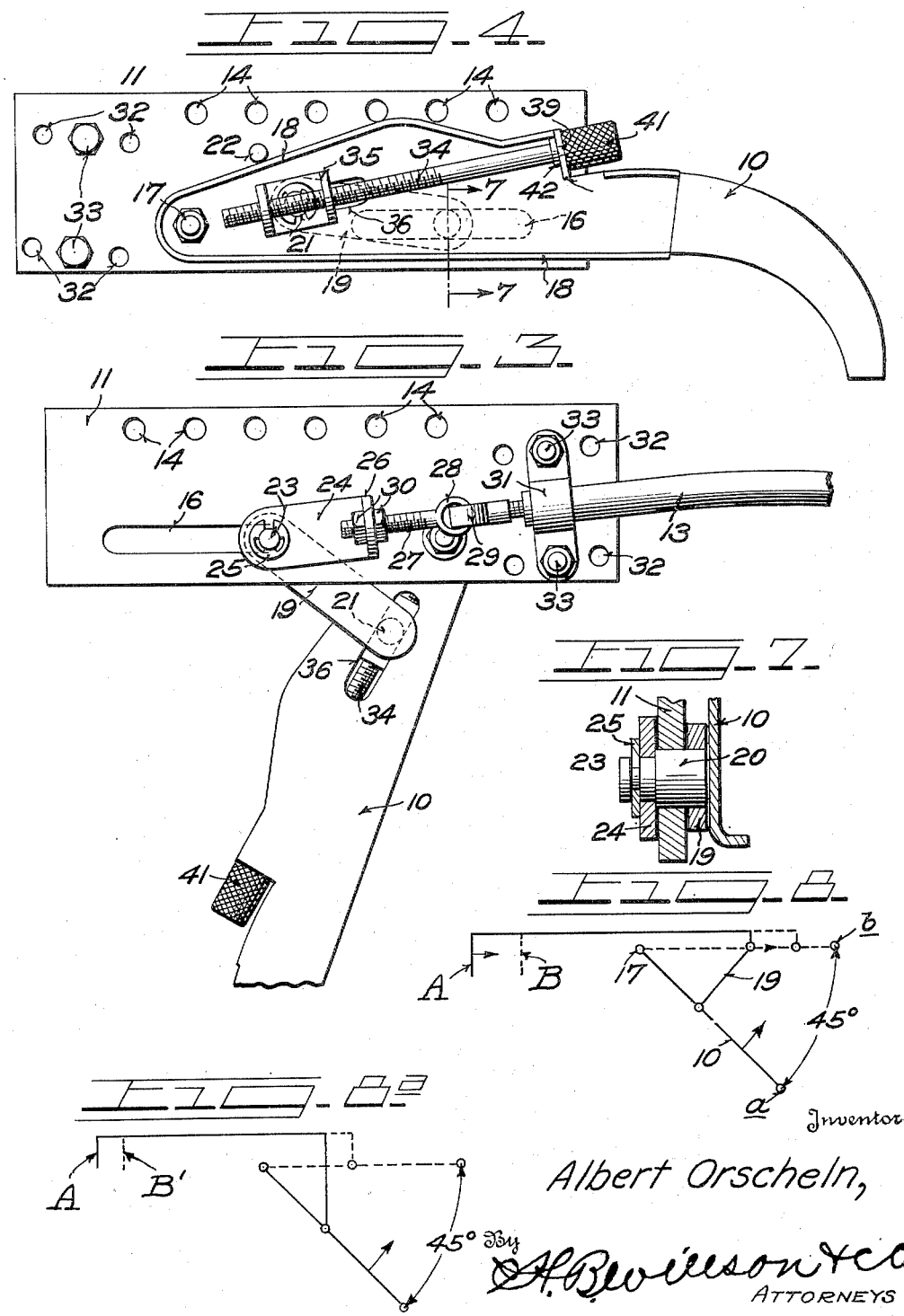

Patented Nov. 28, 1950

2,531,740

UNITED STATES PATENT OFFICE 2,531,740

BRAKE OPERATING OR SIMILAR MECHANISM

Albert Orscheln, Moberly, Mo., assignor of thirty-five one-hundredths to William C. Orscheln, Moberly, Mo., thirty-five one-hundredths to Edward J. Orscheln, Columbia, Mo., ten one-hundredths to Theodore B. Orscheln, Granite City, Ill., and ten one-hundredths to Aloysius G. Orscheln, Kansas City, Mo.

Application December 27, 1948, Serial No. 67,499

8 Claims. (Cl. 74—491)

My invention relates to vehicle brake operating or similar mechanisms of the general type shown in my U. S. Patent No. 2,171,403, August 29, 1939, and my pending applications Serial Nos. 770,518 and 770,519 (now Patent No. 2,464,096), both filed August 25, 1947, the present application being a continuation in part of Serial No. 770,518 (now abandoned).

The invention is particularly adapted for the hand operated emergency or parking brake of a motor vehicle, and its primary object is to provide a mechanism well adapted to motor vehicles of present-day designs, which has few and simple parts and hence may be manufactured and installed expeditiously and at reasonable cost, which may be easily adjusted by the user of the vehicle to compensate for wear of the brake bands and other parts, and which will be reliable and effective in operation.

Further objects of the invention are to provide an improved structure of this character in which the hand lever will have a much shorter operating stroke than in the mechanisms of my previous inventions, in which the hand lever will exert a pushing force to actuate the brake cable, rod or similar connection rather than have a pulling action, in which the hand lever, during its brake actuating stroke, will initially have a low mechanical advantage and produce a rapid take up of the cable and during the remainder of the stroke the mechanical advantage will increase while the speed of the take up of the cable will decrease, in which the hand lever will give the cable a straight-line movement as it leaves the cable armor or housing in the brake actuating stroke of the lever, and in which the hand lever is so connected that it passes over dead center at the end of its actuating stroke thereby effecting a simple lock for the lever rendering the conventional pawl and ratchet lock unnecessary.

Additional objects and advantages will be made manifest in the following specification of apparatus incorporating the invention, it being understood that modifications, variations and adaptations may be resorted to within the spirit and scope and the principles of the invention as herein claimed.

In the accompanying drawings illustrating the preferred embodiment of my invention:

Fig. 1 is a longitudinal sectional view through a portion of an automobile showing one application of the improved mechanism, parts being in elevation.

Fig. 2 is an elevation of one side of the mechanism, the hand lever being shown in its idle or brake "off" position.

Fig. 3 is a similar view of the other side of the mechanism shown in Fig. 2.

Fig. 4 is a view similar to Fig. 2 but showing the hand lever in its operative or brake "on" position.

Fig. 5 is a top view with the parts in the position shown in Fig. 4.

Fig. 6 is a detail sectional view on the plane of line 6—6 in Fig. 2.

Fig. 7 is a detail section taken on line 7—7 of Fig. 4.

Figs. 8 and 8a are diagrams.

Referring in detail to the drawings 10 denotes a hand lever supported in a downwardly and rearwardly inclined position from a horizontally disposed supporting and attaching body 11 suitably fixed beneath the cowling of the automobile as indicated in Fig. 1. In the latter a conventional brake B is associated with the propeller shaft and is actuated by a cable 12 extending through a tubular armor or housing 13 but the improved mechanism is adapted to operate any other form of brake and the operating connection 12 may take the form of a rod or the like.

The body 11 is preferably in the form of a flat rectangular metal plate which is vertically disposed and extends forwardly and rearwardly, its upper portion being provided with a row of holes 14 to receive bolts or similar fastenings 15 whereby it is secured to a frame member under the cowling or instrument panel. Body panel 11 is formed near its lower edge and at its front portion with a longitudinally extending slot 16 and the lever 10 is fulcrumed at its upper end on a bolt or other pivot 17 located on plate 11 in the horizontal plane of slot 16 and to the rear of the latter.

Lever 10 is preferably formed from a stamped metal plate and has a stiffening edge flange 18 but its lower free end is provided with a suitable hand grip which is longitudinally curved and thicker in cross-section than the main portion of the lever. As seen in Fig. 5 the fulcrumed end of the lever is laterally offset to contact with plate 11 near the pivot 17, so that the major portion of the lever is spaced from the plate to accommodate a push link 19 connected at one end to the lever and at its other end to a slide 20 in the form of a pin extending through and slidable in slot 16. The slidable pin 20 has one end suitably fixed to one side of the link as by welding, riveting or integral formation, and to the other or free end of the pin is suitably connected to the brake rod or cable 12 as presently described. The link 19 is provided on its opposite side and at its opposite end with a similar pin 21 which serves to pivotally connect the link to the lever, the latter pivotal connection being preferably adjustable as hereinafter described. It will be seen that the portion of the lever between its pivot 17 and the link pivot 21 forms one arm of a toggle, the other arm of which is formed by the link 19 so that when the hand lever is swung upwardly from the idle position shown in Fig. 2 to the operative position shown in Fig. 4, the slidable pin 20 will be pushed along slot 16 to pull the brake actuating cable 12, and that the pin 21 which forms the knee of the toggle can pass the dead-center of the lever and thus the lever will be locked in its "on" or brake applied position without the necessity of using the customary pawl and ratchet or other locking means for holding the brake applied. To limit the movement of the lever in its past-dead-center position a stop pin 22 may be welded or otherwise secured to one face of plate 11 for engagement by an edge of the lever as seen in Fig. 4.

The connection of the slide or pin 20 to the brake cable is preferably accomplished as shown in Figs. 3 and 5. The end of pin 20 projecting beyond plate 11 is reduced as at 23 to enter an opening in one arm of a right angular link 24 and the link is retained on such reduced pivot 23 by a split resilient ring or key 25 having inwardly projecting portions to snap into an annular groove formed adjacent the end of the pivot 23. The other arm 26 of the angular link projects outwardly from the adjacent face of the plate 11 and is apertured to receive an adjusting screw 27 having at one end an eye 28 engaged by an eye connection 29 secured to the end of the cable 12. Nuts 30 on screw 27 engage opposite sides of the arm 26 and permit adjustment of the screw on the angle link 24. The cable armor 13 is rigidly anchored to the plate 11 by a suitable clamp 31 preferably a U-shaped strap having in its ends apertures so that they may be aligned with any pair of rows of apertures 32 formed in the rear portion of plate 11, for the reception of bolts 33. The end of the armor 13 is held in substantial alignment with the slot 16 so that the cable will have a straight line movement as it leaves the armor when the brake is actuated.

The knee pin 21 of the toggle is adjustable longitudinally of the hand lever to enable the user of the vehicle to readily adjust the brakes to compensate for wear of the brake bands or shoes or of other connecting parts. This adjustment is preferably effected by an adjusting screw 34 swiveled for rotation on the hand lever and engaged with a nut member 35 pivoted on pin 21 which extends through and slides in a slot 36 formed in the lever. Pin 21 which has one end welded or riveted in link 19, extends through slot 36 and through a central circular opening formed in the yoke or U-shaped member 35, the latter being retained on the pivot pin 21 by a cotter pin or similar fastening such as the split resilient locking ring or key 38 having inwardly projecting tongues to spring into an annular groove formed in the pin as seen in Fig. 6. The two arms of the U-shaped nut member 35 have aligned threaded openings through which the threaded portion of the adjusting screw 34 extends. Screw 34 is aligned with the longitudinally extending slot 36 and its lower end is swiveled for rotation at 39 a little above the hand grip. A downwardly facing notch 40 is formed in the widened intermediate portion of the lever to accommodate a knurled finger piece 41 on the lower extremity of the adjusting screw. The swiveled mounting is effected by enlarging the edge flange of the lever to form a bearing ear at the upper end of notch 40, the screw being rotatable in said ear and being held against endwise movement by the fingerpiece on one side of the ear and a fixed collar or flange 42 on the other side.

It will be seen that when the fingerpiece or knob is rotated, the nut 35 will travel on the screw and carry with it the pin 21, thus varying the length of one arm of the toggle and hence causing the slidable pin 20 to move to a greater or less extent in the guide slot 16 according to the direction of rotation of the adjusting screw. By this adjustment travel of the angle link 24 and consequently the travel of the brake cable or rod 12 on each brake actuating movement of the hand lever may be varied to easily and rapidly adjust any free play in the brake system resulting from wear or other causes.

The brakes will of course be fully applied when the lever hits the stop 22, but the extent of its downward movement to idle position will vary according to the adjustment of the pin 21 in the lever slot 36. The engagement of the pin 20 with the rear end of slot 16 limits the downward movement of the lever. When pin 21 is at the upper end of slot 36 the extent of movement of the lever will be a little less than 60° but when the pin 21 is adjusted to the lower end of said slot the lever movement will be about 45°. The travel of the lever is therefore relatively short as compared with the mechanism of my above-mentioned Patent No. 2,171,403 as will be noted on reference to the diagrams of Figs. 8 and 8a. Fig. 8 shows the system of linkages of the present invention and it will be seen that by moving the lever 10 through an arc of 45° from point $a$ to point $b$ a travel of the brake rod from A to B is obtained. Fig. 8a represents the system of linkages employed in my patent, and it will be seen that a 45° swing of the lever will move the brake rod from point A' to B'. The distance from A to B is twice that from A' to B' with the same degree of movement of the lever, and hence the present invention will give a greater travel of the brake rod with the same travel of the hand lever.

Because of the mounting of the lever and link it will be seen that at the beginning of the brake applying stroke of the lever there will be a rapid take up of the slack or free play in the system with a low mechanical advantage but as the stroke continues the mechanical advantage increases and there is a less rapid take up. It will be further observed that with this lever and link arrangement the brake cable will in effect be pushed in the brake applying operation rather than be pulled as in my prior inventions. Since the hand lever when it strikes stop, has carried the axis of the pivot pin 21 above the horizontal plane passing through the axes of pivots 17 and 20, the mechanism will be effectively held in brake "on" position and no other latching or locking means will be necessary to hold the brakes applied. In other words, the relation of said push link 19 and said slidable pin 20 with the lever fulcrum 17 is such that the brake applying line of pull terminating at the pin 21 will move from one side of the lever fulcrum to the opposite side thereof when said lever is moved upwardly to brake applied position, and the lever will remain in said brake applied position until forced therefrom.

It will be observed that the mechanism is such that it has only two positions, one in which the brakes are completely "on" or applied and the other in which the brakes are completely "off." This prevents the possibility of dragging brakes, the latter being a definite fire hazard when the usual hand brakes are left partly applied through carelessness on the part of the driver. It will of course be understood that when the brakes are to be released, it is only necessary to push the hand lever downwardly to a sufficient extent to brake the toggle, that is, move pin 21 to the other side of the lever fulcrum, since gravity will cause the lever to swing downwardly until pin 20 reaches the rear end of slot 16, and the spring mechanism associated with the usual brakes will retract the cable 12.

While the present preferred embodiment of the invention has been described in detail, it will be understood that changes and variations in the form and arrangement of parts and in details of construction, may be made within the spirit and scope of the following claims.

I claim:

1. An apparatus of the character described having in combination a supporting plate positioned vertically beneath the instrument panel of a motor vehicle and extending in a forward and rearward direction, said plate having in its forward portion a longitudinally extending slot, a slide movable in said slot, a push link connected at one of its ends to said slide on one side of said plate, a hand lever pivoted at its upper end to said one side of said plate and positioned to the rear of said slot, a pivotal connection between the other end of said push link and an intermediate portion of said lever, a brake actuating element slidably mounted on the other side of said plate and connected to the other end of said slide, the relation of said push link and said slide with the lever fulcrum being such that when the lever is swung upwardly to brake-applied position the pivotal connection of said link to said lever will move from one side of said lever fulcrum to the opposite side thereof causing said lever to remain in said brake-applied position until forced therefrom, and stop means for limiting the extent which said lever may move in brake applying direction.

2. The structure specified in claim 1 in which said pivotal connection between said link and said lever is adjustable lengthwise of said lever, together with manually operable means carried by said lever for adjusting said pivotal connection.

3. A brake operating or similar mechanism comprising an elongated body having means by which it may be fixedly mounted, a slide supported on said body for rectilinear movement adjacent one end of said body, a tensioned work-performing element connected to said slide and extending from the other end of said body, a lever fulcrumed at one of its ends on an intermediate portion of said body in longitudinally spaced relation to said slide and projecting from one side of said body, and a push link connected at one of its ends to said slide and at its other end to an intermediate portion of said lever, the relation of said push link and slide with the lever fulcrum being such that pull of said tensioned work-performing element terminating at the pivotal connection of said push link with said lever will move from one side of said lever fulcrum to the opposite side thereof when the free end of said lever is swung in the direction of said body to a predetermined point, causing said lever to remain at said predetermined point until forced therefrom, and stop means for stopping said lever at said predetermined point.

4. The structure of claim 3 in which said pivotal connection of said link with said lever is slidable longitudinally of said lever, together with means carried by said lever for adjusting the last-mentioned pivotal connection.

5. A brake operating or similar mechanism comprising an elongated body having means by which it may be fixedly mounted, a slide supported on said body for rectilinear movement adjacent one end of said body, a tensioned work-performing element connected to said slide and extending from the other end of said body, a lever fulcrumed at one of its ends on an intermediate portion of said body in longitudinally spaced relation to said slide and movable from an idle position in which it projects from one side of said body to an operative position in which it extends longitudinally of said body, a push link pivotally connected at one of its ends to said slide and at its other end to an intermediate portion of said lever, said link and the portion of the lever between its fulcrum and the pivotal connection of said link to said lever forming a toggle with the last-mentioned pivotal connection forming the knee of the toggle and being movable past the dead center of said lever when said lever is moved to said operative position, and stop means for limiting the movement of said lever beyond said past-dead-center operative position.

6. A brake operating or similar mechanism comprising an elongated plate vertically disposed and fixedly supported, said plate having adjacent one end a longitudinally extending slot, a lever pivoted at one of its ends on one side of said plate at a point longitudinally spaced from one end of said slot, said lever being swingable from a downwardly inclined idle position to an upper operative position in which it extends in the direction of the length of said plate and at the slotted portion of the latter, said lever having at its intermediate portion a longitudinally extending slot, a push link disposed on the same side of said plate as said lever and having on its opposite sides oppositely projecting pivot pins, one of said pins extending through and slidable in the slot in said plate and the other pin projecting through and slidable in the slot of said lever, a tensioned work-performing element connected to the free end of said pin on the other side of said plate and extending from the end of said plate opposite that having said slot, a threaded nut member carried by the free end of said pin which extends through the slot in said lever, an adjusting screw swiveled for rotation on said lever and engaged with said nut member, and a stop on said plate to limit the upward swinging movement of said lever when the axis of the pin in the lever slot passes the dead-center of the lever fulcrum.

7. In a brake operating mechanism for a motor vehicle, a substantially-horizontal elongated support positioned beneath the instrument panel of a motor vehicle and extending in a forward and rearward direction, said support having at its forward portion a longitudinally extending guide, a slide movable in a forward and rearward direction in said guide, a vertically-swingable, brake-operating hand lever having its upper end fulcrumed to said support in rearwardly spaced relation to the rear end of said guide, said lever being movable from a normal brake-off position in which it extends in a downward and forward direction from said support at an angle of approximately 47° to the longitudinal axis of said guide, to a brake-on position in which it extends substantially horizontal and longitudinally of said support, a brake-actuating member connected to and extending rearwardly from said slide, said member being movable in a forward direction to apply a brake, a push link pivoted at one end to said slide and at its other end to an intermediate portion of said lever, said link being normally inclined in an upward and forward direction from said lever, the parts being so constructed and arranged that when said lever is swung from its brake-off position to its brake-on position said link will push said slide in a forward direction to move said brake-actuating member forwardly, and the pivotal connection of said link to said lever will move from one side of said lever fulcrum to the opposite side thereof, causing said lever to remain in its brake-on position until forced therefrom, and stop means to limit the upward swinging movement of said lever.

8. In a brake operating mechanism for a motor vehicle, a flat, elongated supporting plate positioned vertically beneath the instrument board of a motor vehicle and extending in a forward and rearward direction, said plate having in its forward portion a longitudinally extending slot, a flat, vertically-swingable, brake-operating hand lever having a laterally-offset upper end contacting with one side of said plate and fulcrumed to the latter in rearwardly spaced relation to the rear end of said slot, said lever being movable from a normal brake-off position in which it extends in a downward and forward direction from said plate at an angle of approximately 47° to the longitudinal axis of said slot, to a brake-on position in which it extends substantially horizontal and longitudinally of said plate, said lever having in its intermediate portion a longitudinally extending slot, a guide at the rear portion of said plate on the side of the latter opposite said one side, a brake-actuating member in said guide and movable in a forward direction to apply a brake, a flat push link disposed between said lever and said plate, one cylindrical pin fixed to one side of said link at one of its ends and projecting through and slidable in said slot in the plate, a second cylindrical pin fixed to the opposite side of said link at its opposite end and projecting through and slidable in said slot in the lever, an angle metal connector having one arm rotatably and detachably secured to the free end of said one pin, an adjustable screw connection between the other arm of said connector and said brake-actuating member, a U-shaped nut member having its cross portion rotatably and detachably secured on the free end of said second pin, the two arms of said U-shaped nut member having aligned screw threaded openings, an adjusting screw swiveled between its ends on the lower part of said lever and having a fingerpiece at one end and screw threads at its other end engaged with the threads in said openings, said link being normally inclined in an upward and forward direction from said lever, the parts being so constructed and arranged that when said lever is swung from its brake-off position to its brake-on position, said link will push said slide in a forward direction to move said brake-actuating member forwardly, and the pin connecting said link to said lever will move from one side of said lever fulcrum to the opposite side thereof causing said lever to remain in its brake-on position until forced therefrom, and a stop on said plate to limit the upward swinging movement of said lever.

ALBERT ORSCHELN.

REFERENCES CITED

The following references are of record in the file of this patent:

UNITED STATES PATENTS

| Number | Name | Date |
|---|---|---|
| 879,005 | Rockstroh | Feb. 11, 1908 |
| 2,171,403 | Orscheln | Aug. 29, 1939 |
| 2,313,768 | Putt | Mar. 16, 1943 |
| 2,398,596 | Turtle | Apr. 16, 1946 |
| 2,464,096 | Orscheln | Mar. 8, 1949 |
| 2,464,097 | Orscheln | Mar. 8, 1949 |

FOREIGN PATENTS

| Number | Country | Date |
|---|---|---|
| 11,491 | Great Britain | May 19, 1904 |
| 717,982 | France | Jan. 16, 1932 |